(12) United States Patent
Sun et al.

(10) Patent No.: US 9,305,255 B2
(45) Date of Patent: Apr. 5, 2016

(54) ELECTRONIC TAG HAVING WRISTBAND

(71) Applicants: HONG FU JIN PRECISION INDUSTRY (ShenZhen) CO., LTD., Shenzhen (CN); HON HAI PRECISION INDUSTRY CO., LTD., New Taipei (TW)

(72) Inventors: Zong-Yuan Sun, New Taipei (TW); Da-Hua Xiao, Shenzhen (CN)

(73) Assignees: HONG FU JIN PRECISION INDUSTRY (ShenZhen) CO., LTD., Shenzhen (CN); HON HAI PRECISION INDUSTRY CO., LTD., New Taipei (TW)

( * ) Notice: Subject to any disclaimer, the term of this patent is extended or adjusted under 35 U.S.C. 154(b) by 225 days.

(21) Appl. No.: 14/065,602

(22) Filed: Oct. 29, 2013

(65) Prior Publication Data

US 2014/0333417 A1 Nov. 13, 2014

(30) Foreign Application Priority Data

May 7, 2013 (CN) .......................... 2013 1 01632945

(51) Int. Cl.
*A44C 5/00* (2006.01)
*G06K 19/077* (2006.01)
*G09F 3/00* (2006.01)
*G08B 21/02* (2006.01)

(52) U.S. Cl.
CPC ...... *G06K 19/07762* (2013.01); *G08B 21/0275* (2013.01); *G08B 21/0286* (2013.01); *G08B 21/0291* (2013.01); *G09F 3/005* (2013.01); *G09F 3/0297* (2013.01)

(58) Field of Classification Search
CPC . G09F 3/005; G09F 3/0297; G06K 19/07762; G08B 21/0275; G08B 21/0286; G08B 21/0291
USPC ........................................................... 40/633
See application file for complete search history.

(56) References Cited

U.S. PATENT DOCUMENTS

| 5,523,740 | A  | * | 6/1996 | Burgmann     | 340/573.4  |
|-----------|----|---|--------|--------------|------------|
| 6,255,951 | B1 | * | 7/2001 | De La Huerga | 340/573.1  |
| 6,774,799 | B2 | * | 8/2004 | Defant et al.| 340/573.4  |
| 8,115,621 | B2 | * | 2/2012 | Rajala et al.| 340/539.13 |

* cited by examiner

*Primary Examiner* — Kristina Junge
(74) *Attorney, Agent, or Firm* — Novak Druce Connolly Bove + Quigg LLP

(57) ABSTRACT

An electronic tag having a wristband includes a base defining at least one receiving notch, a radio frequency identification element received in the base, at least one connecting element connecting the radio frequency identification element, a locking module captured in the receiving notch and resisting the connecting element, and a wristband mounted in the locking module. The radio frequency identification element, the connecting element, the locking module, and the wristband cooperate to form a closed loop circuit to achieve an electric induction. When the wristband is detached from the locking module, the closed loop circuit is cut and the radio frequency identification element sends out an alarm.

9 Claims, 6 Drawing Sheets

ELECTRONIC TAG HAVING WRISTBAND

BACKGROUND

1. Technical Field

The present disclosure relates to an electronic tag having a wristband.

2. Description of Related Art

Electronic tags are now widely used. The electronic tag commonly includes a radio frequency identification element received in a housing to transmit wireless data. However, the current electronic tags are not convenient to carry and use.

Therefore, there is room for improvement within the art.

BRIEF DESCRIPTION OF THE DRAWINGS

Many aspects of the disclosure can be better understood with reference to the following drawings. The components in the drawings are not necessarily drawn to scale, the emphasis instead being placed upon clearly illustrating the principles of the disclosure. Moreover, in the drawings, like reference numerals designate corresponding parts throughout the several views.

DETAILED DESCRIPTION

Figure 1:
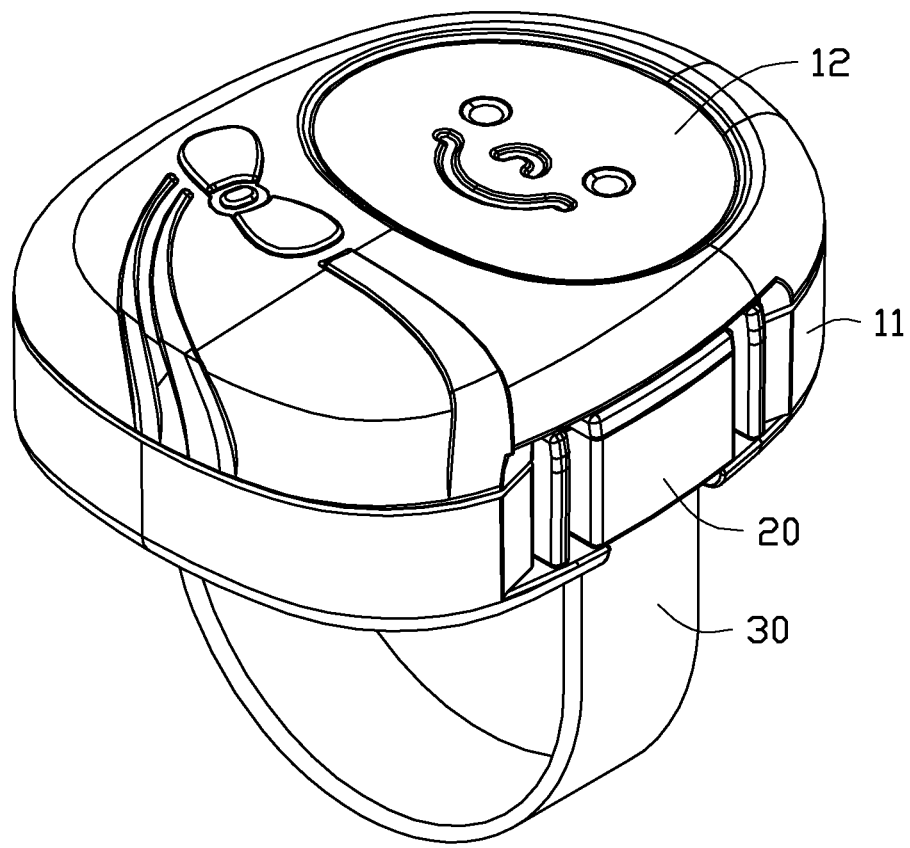
FIG. 1 is an assembly view of an electronic tag having a wristband in accordance with an exemplary embodiment.
Figure 2:
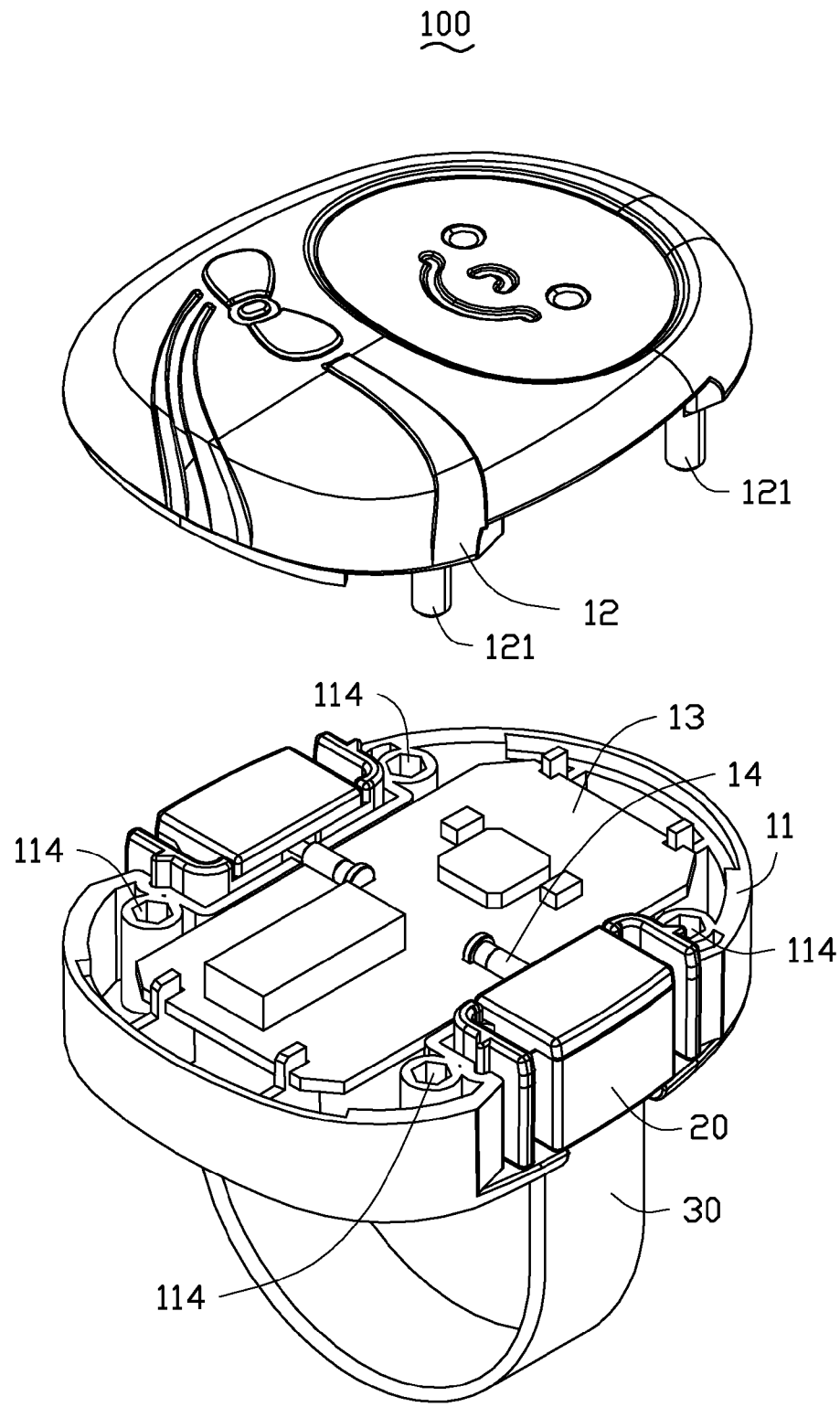
FIG. 2 is a partially exploded view of the electronic tag of FIG. 1.

FIGS. 1-2 show an exemplary embodiment of an electronic tag 100 having a wristband (herein after "electronic tag 100") for describing the disclosure. The electronic tag 100 includes a base 11, a cover 12, a radio frequency identification element 13, two connecting elements 14, two locking modules 20, and a wristband 30.

Figure 3:
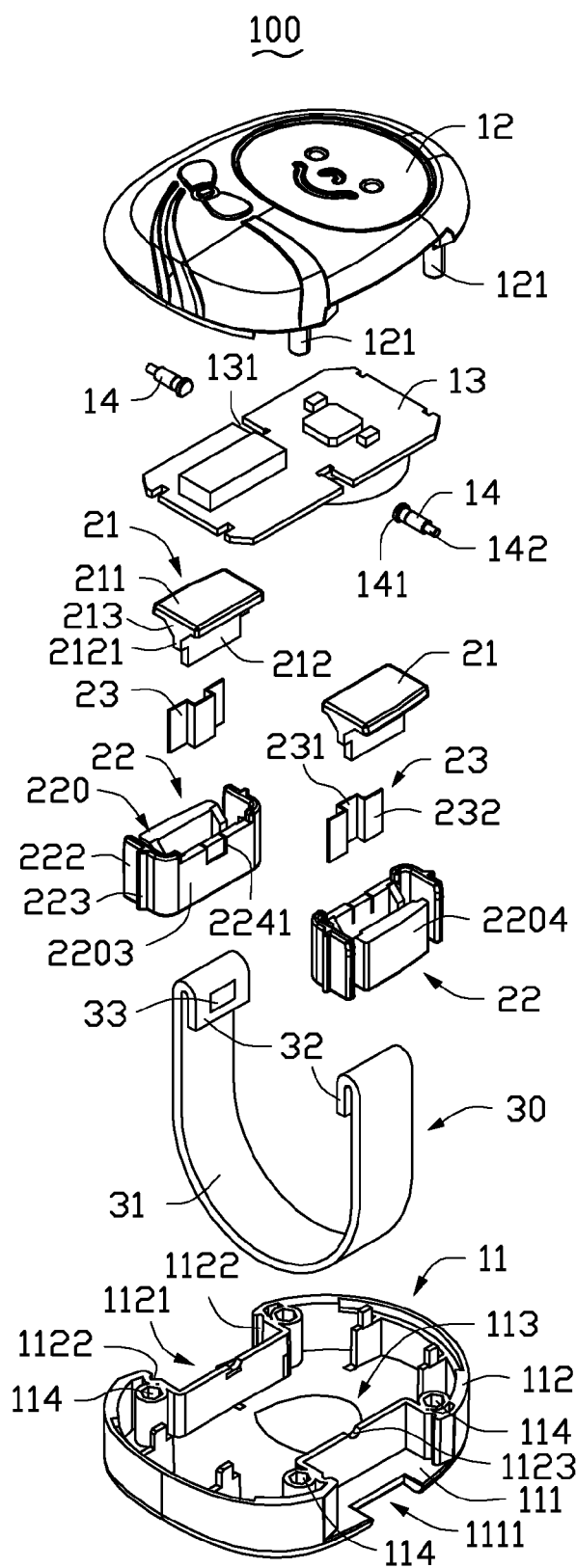
FIG. 3 is an exploded view of the electronic tag of FIG. 2.

FIG. 3 shows that the base 11 includes a board 111 and a side wall 112 perpendicularly protruding from the board 111. The board 111 and the side wall 112 cooperate to form a receiving cavity 113. The side wall 112 has two opposite sides sagging towards the receiving cavity 113, thus defining two opposite receiving notches 1121. Each receiving notch 1121 has two opposite walls respectively defining a catching groove 1122, and a connecting wall connecting the two opposite walls defining a supporting groove 1123. Adjacent to each opposite wall of the receiving notches 1121, a limiting hole 114 is formed and is positioned in the receiving cavity 113. Each receiving notch 1121 also has a bottom wall defining a cutout 1111.

The cover 12 has a shape matching with the base 11. The cover 12 includes a plurality of limiting pins 121 corresponding to the limiting holes 114 to mount the cover 12 to the base 11. The radio frequency identification element 13 is received in the receiving cavity 113. The radio frequency identification element 13 has two opposite sides, which respectively define a "T" shaped matching groove 131. A wall of the matching groove 131 has a plurality of electrical conductive contacts (not shown). The connecting element 14 may be a precise connector, such as a pogo pin. The connecting element 14 includes a first end 141 and a second end 142. The first end 141 is captured in the matching groove 131 and contacts the electrical conductive contacts.

Figure 4:
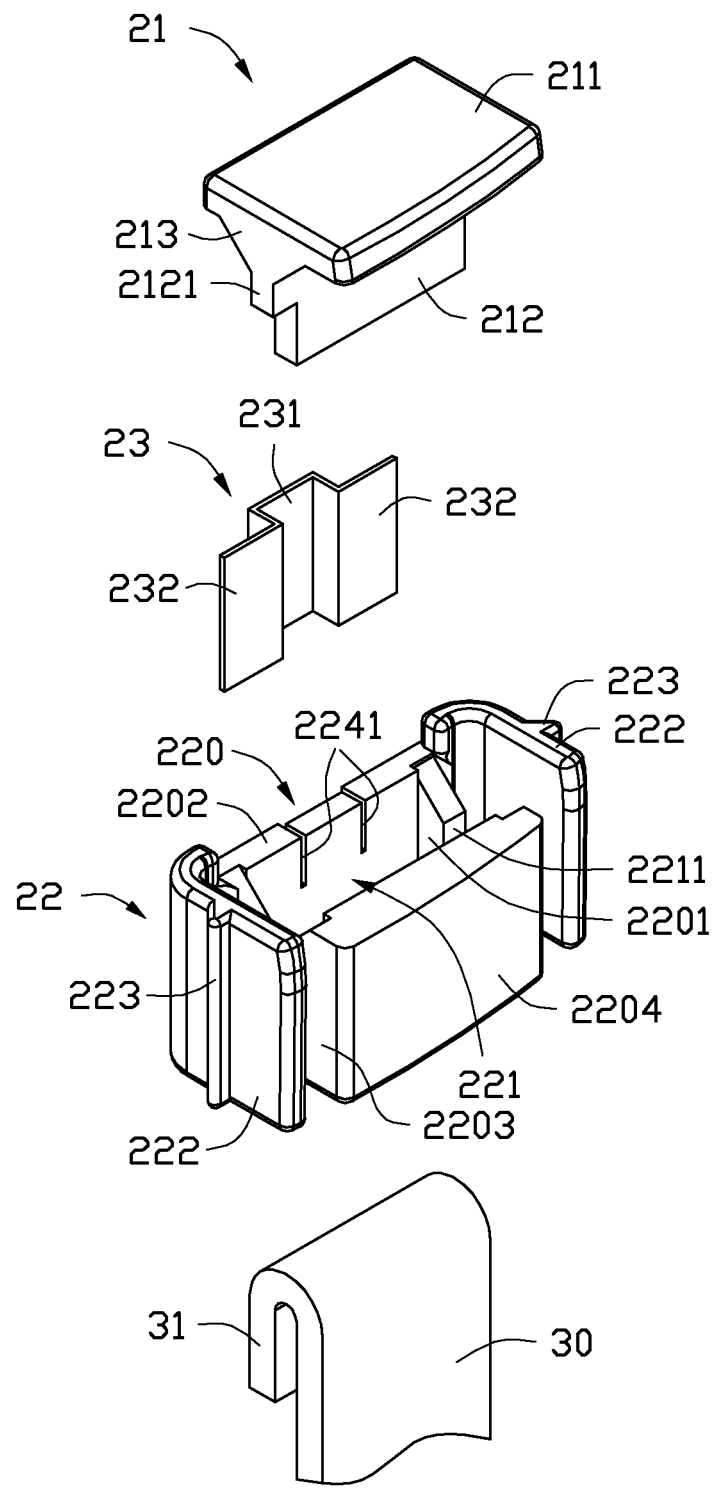
FIG. 4 is an enlarged view of a lock catch and partial of the wristband of the electronic tag of FIG. 3.
Figure 5:
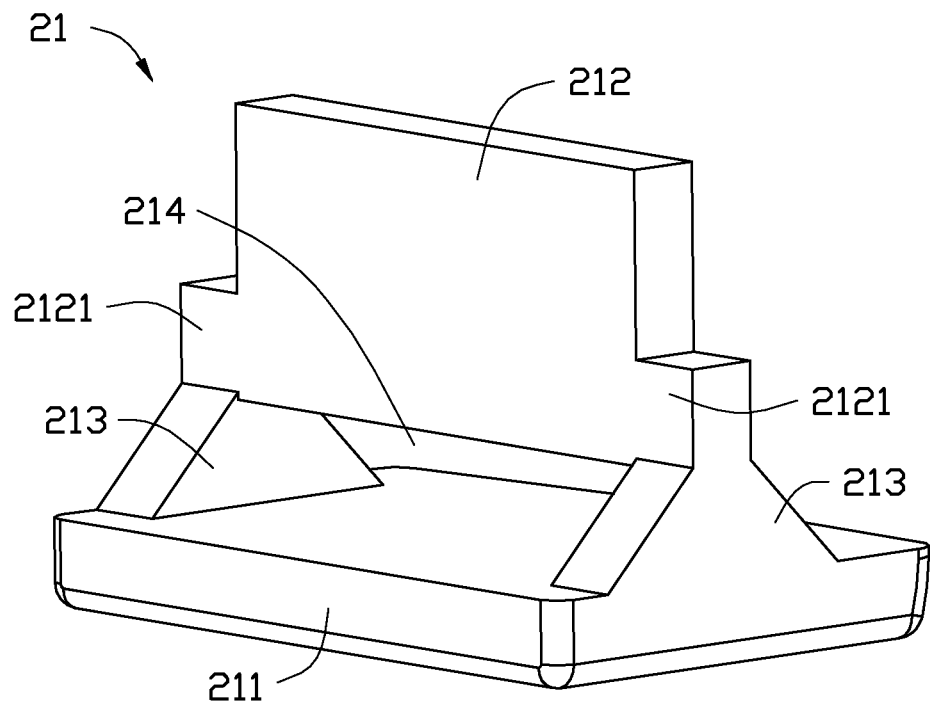
FIG. 5 is an enlarged view of a catching member of the electronic tag of FIG. 3.

FIGS. 4-5 show that each locking module 20 includes a catching member 21, a receiving member 22, and a conductive sheet 23 which is electrical conductive. Each catching member 21 includes a top plate 211, a catching plate 212, and two connecting sections 213. The catching plate 212 forms two protrusions 2121 at the two opposite sides of the catching plate 212. Each protrusion 2121 connects one of the connecting sections 213. Each connecting section 213 has a trapezoid cross section. The two connecting sections 213 are spaced and parallel, and perpendicularly connect the top plate 211. The catching plate 212, the two connecting sections 213, and the top plate 211 cooperate to define a through groove 214.

Figure 6:
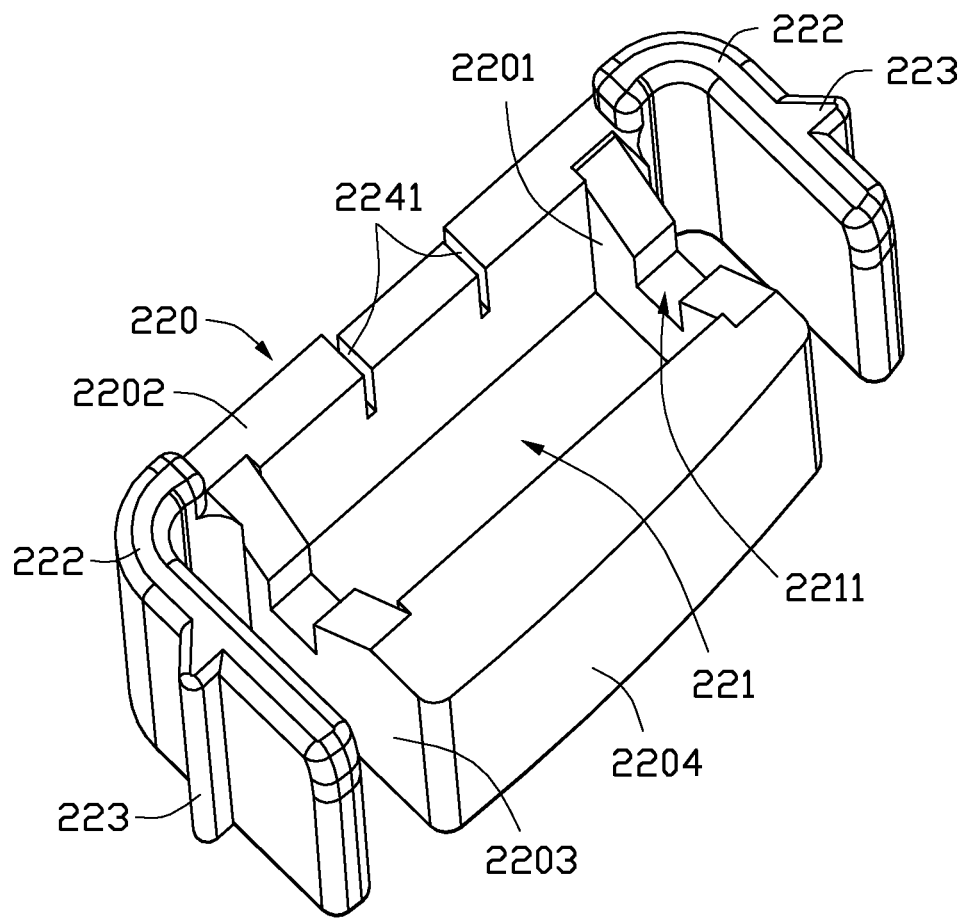
FIG. 6 is an enlarged view of a receiving member of the electronic tag of FIG. 3.

FIG. 6 shows that the receiving member 22 includes a main body 220 and two arms 222. The main body 220 includes a first wall 2201, a second wall 2202, a third wall 2203, and a fourth wall 2204 which connect to each other end to end and define a mounting slot 221. The mounting slot 221 is for receiving the catching plate 212 of the catching member 21. The first wall 2201 and the third wall 2203 respectively define a locking notch 2211 which are for receiving and locking the protrusions 2121 of the catching plate 212. The second wall 2202 defines two spaced limiting grooves 2241. The two ends of the second wall 2202 respectively extend one of the arms 222. The free end of the arm 222 adjacent to the first wall 2201 is parallel to and spaced from the first wall 2201, the free end of the arm 222 adjacent to the third wall 2203 is parallel to and spaced from the third wall 2203. Each arm 222 includes a catching portion 223 formed on the surface of the free end away from the first/third wall 2201/2203.

The conductive sheet 23 may be a metal sheet. The conductive sheet 23 includes a main block 231 and two extending blocks 232. The main block 231 has two perpendicularly extending ends parallel to each other, each extending block 232 perpendicularly connects to one of the extending ends. The distance between the two extending ends of the main block 231 is matched with the distance between the two limiting grooves 2241 of the second wall 2202, thereby the conductive sheet 23 can be mounted to the second wall 2202 by the main block 231 catching in the limiting grooves 2241. When the conductive sheet 23 is mounted to the second wall 2202, the two extending ends of the main block 231 are received in the limiting grooves 2241, and the extending blocks 232 is positioned in the mounting slot 221.

The wristband 30 includes a main portion 31. The main portion 31 has two bent adjusting ends 32. The wristband 30 is made of flexible insulating materials which envelop electrical conductive materials therein. In the exemplary embodiment, the flexible insulating material may be silicon gel. The electrical conductive material can be metal. The electrical conductive material of each adjusting end 32 is partially exposed to form a conductive terminal 33.

During assembling of the electronic tag 100, the radio frequency identification element 13 is positioned on the base 11 and received in the receiving cavity 113. Each adjusting end 32 of the wristband 30 passes through one corresponding mounting slot 221 of one of the receiving members 22 and one through groove 214 of one of the catching members 21. The protrusions 2121 are then captured in the locking notches 2211 to mount the catching members 21 to the receiving members 22. The main block 231 of each conductive sheet 23 is positioned in the limiting grooves 2241 of one of the receiving members 22 to assemble the conductive sheet 23 to the receiving member 22. At this time, the electrical conductive terminal 33 of each adjusting end 32 resists one of the extending blocks 232 of the conductive sheet 23. The receiving members 22 are then positioned in the receiving notches 1121, allowing the catching portions 223 to be captured in the catching grooves 1122, and a part of the main portion 31 of the wristband 30 to be received in the cutout 1111. Each connecting element 14 is captured in one of the supporting grooves 1123, allowing the first end 141 of the connecting element 14 to be captured in the matching groove 131 of the radio frequency identification element 13, and the second end 142 to resist the main block 231 of one of the conductive sheets 23. As such, the radio frequency identification element 13, the connecting elements 14, the conductive sheets 23 of the locking modules 20, and the wristband 30 cooperate to form a closed loop circuit to achieve an electric induction. Finally, the limiting pins 121 are inserted into the limiting holes 114 to allow the cover 12 to be mounted on the base 11 to finish the electronic tag 100.

When the two arms 222 are pulled towards the fourth wall 2204 to make the catching portions 223 disengage from the catching grooves 1122, and the receiving members 22 are removed away from the base 11, the locking modules 20 can be detached from the electronic tag 100.

When the locking modules 20 are detached from the electronic tag 100, the closed loop circuit is cut, then the radio frequency identification element 13 sends out alarm to remind users of abnormal status.

The exemplary electronic tag 100 having the wristband 30 can be conveniently used, assembled, and detached for the locking module 20 is removably captured in the base 11. Further, the wristband 30 of the electronic tag 100 can also be conveniently taken off.

It is believed that the exemplary embodiment and its advantages will be understood from the foregoing description, and it will be apparent that various changes may be made thereto without departing from the spirit and scope of the disclosure or sacrificing all of its advantages, the examples hereinbefore described merely being preferred or exemplary embodiment of the disclosure.

What is claimed is:

1. An electronic tag having a wristband, comprising:
   a base defining at least one receiving notch;
   a radio frequency identification element received in the base;
   at least one connecting element connected to the radio frequency identification element;
   a locking module captured in the receiving notch and resisting the at least one connecting element; and
   a wristband mounted in the locking module, the radio frequency identification element, the connecting element, the locking module, and the wristband cooperating to form a closed loop circuit;
   wherein the base defines two receiving notches opposite to each other, the locking module comprises two catching members corresponding to the two receiving notches, each catching member comprises a top plate, a catching plate, and two connecting sections, the catching plate forms two protrusions at the two opposite sides of the catching plate, each protrusion connects one of the connecting sections, the two connecting sections are parallel and spaced, and perpendicularly connect the top plate, the catching plate, the two connecting sections, and the top plate cooperate to form a through groove.

2. The electronic tag as claimed in claim 1, wherein the base comprises a board and a side wall perpendicularly protruding from the board, the board and the side wall cooperate to form a receiving cavity, the radio frequency identification element is received in the receiving cavity.

3. The electronic tag as claimed in claim 2, wherein the side wall comprises two opposite sides sagging towards the receiving cavity to define the receiving notches, each receiving notch comprises two opposite walls respectively defining a catching groove, and a connecting wall connecting the two opposite walls defining a supporting groove.

4. The electronic tag as claimed in claim 3, wherein adjacent to each opposite wall of the receiving notches, a limiting hole is formed and positioned in the receiving cavity, the electronic tag further comprises a cover matching to the base, the cover comprises a plurality of limiting pins which are mounted in the limiting holes to mount the cover to the base.

5. The electronic tag as claimed in claim 4, wherein the locking module comprises two receiving members corresponding to the two receiving notches, each receiving member comprises a main body and two arms, the main body comprises a first wall, a second wall, a third wall, and a fourth wall which connect to each other end to end and form a mounting slot for receiving the catching plate of the catching member, the first wall and the third wall respectively define a locking notch for receiving and locking the protrusions of the catching plate, the two ends of the second wall respectively extend one of the arms.

6. The electronic tag as claimed in claim 5, wherein the locking module comprises two conductive sheets, each conductive sheet comprises a main block and two extending blocks, the main block comprises two perpendicularly extending ends parallel to each other, each extending block perpendicularly connects to one of the extending ends of the main block, the second wall defines two limiting grooves, the main block is captured in the limiting grooves thereby mounting the conductive sheet to the main body of the receiving member, and allowing the extending blocks to be positioned in the mounting slot.

7. The electronic tag as claimed in claim 6, wherein the radio frequency identification element comprises two opposite sides which respectively define a through matching groove with the wall of the matching groove defined a plurality of electrical conductive contacts, the electronic tag comprises two connecting elements, each connecting element comprises a first end and a second end, the first end is captured in the matching groove and contacts the electrical conductive contacts, the second end resists the main block of the conductive sheet, the radio frequency identification element, the two connecting elements, the locking module, and the wristband cooperating to form a closed loop circuit, when the wristband is detached from the locking modules, the closed loop circuit is cut and the radio frequency identification element sends out alarm.

8. The electronic tag as claimed in claim 6, wherein the wristband comprise a main portion, the main portion comprises two bent adjusting ends, the wristband is made of flexible insulating materials which envelop electrical conductive materials therein, each adjusting end passes through one of the through grooves of the catching members, the electrical conductive material of each adjusting end is partially exposed to form a conductive terminal.

9. The electronic tag as claimed in claim 8, wherein each arm of the receiving member comprises a catching portion, the catching portion is captured in the catching groove of the base, the conductive terminal of each adjusting end resists the extending blocks of one of the conductive sheet, the connecting element is captured in the supporting grooves.

\* \* \* \* \*